(12) United States Patent
Mizutani et al.

(10) Patent No.: US 6,334,834 B1
(45) Date of Patent: Jan. 1, 2002

(54) AUTOMATIC ENGINE STOP CONTROL SYSTEM FOR VEHICLES

(75) Inventors: Koichi Mizutani, Toyota; Yasushi Kusaka, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/533,926

(22) Filed: Mar. 23, 2000

(30) Foreign Application Priority Data

Mar. 25, 1999 (JP) .............................. 11-82219
Feb. 17, 2000 (JP) .............................. 12-40078

(51) Int. Cl.[7] .............................................. B60K 41/20
(52) U.S. Cl. ..................................................... 477/203
(58) Field of Search .............................. 477/187, 203, 477/205

(56) References Cited

U.S. PATENT DOCUMENTS

| | | | |
|---|---|---|---|
| 4,414,937 A | | 11/1983 | Ueda et al. |
| 4,416,230 A | * | 11/1983 | Katayose et al. ........... 123/325 |
| 4,630,557 A | * | 12/1986 | Cornacchia ............. 123/179 B |

FOREIGN PATENT DOCUMENTS

| | | | |
|---|---|---|---|
| JP | 7-266932 | | 10/1995 |
| JP | 7-269392 | | 10/1995 |
| JP | 08239031 A | * | 9/1996 |
| JP | 2000104586 A | * | 4/2000 |
| JP | 2000161104 A | * | 6/2000 |
| JP | 2000203415 A | * | 7/2000 |

\* cited by examiner

*Primary Examiner*—Dirk Wright
(74) *Attorney, Agent, or Firm*—Oblon, Spivak, McClelland, Maier & Neustadt, P.C.

(57) ABSTRACT

An automatic engine stop control system for a vehicle in which: an engine is activated when fed with a fuel; and an action mechanism has an action content influenced by a rotating state of the engine; and the fuel feed to the engine is stopped when predetermined conditions are satisfied during the running of the vehicle comprises: a rotating state decider for deciding that the engine is forced to rotate by a running inertia force owned by the vehicle while the vehicle is coasting; an action state decider for deciding the action content of the action mechanism in the state where the engine is forced to rotate by the running inertia force of the vehicle; and an automatic stop inhibitor for inhibiting the stop of the fuel feed to the engine when it is decided by the action state decider means that the action content of the action mechanism is insufficient.

7 Claims, 5 Drawing Sheets

AUTOMATIC ENGINE STOP CONTROL SYSTEM FOR VEHICLES

BACKGROUND OF THE INVENTION

1. Field of the Invention

The present invention relates to a control system for executing an automatic stop control of an engine when predetermined engine stop conditions are satisfied during the running of a vehicle.

2. Related Art

In recent years, a vehicle having an internal combustion engine such as a gasoline engine mounted thereon is more and more demanded to reduce emissions and improve a fuel economy. In order to satisfy these demands: reductions have been made in the weight of a body; technical improvements have been made for lean-burning; and techniques have been developed for stopping the feed of a fuel in accordance with running states. Of these techniques, one is a fuel feed stop control (or a fuel-cut control) at a deceleration. This is a control for suppressing a fuel consumption at the deceleration with a fully closed throttle by interrupting the fuel feed to the engine in the state where the engine speed is within such a range of a predetermined number of revolutions per minute as enables the restart of the engine by reopening the fuel feed.

In this fuel-cut control, the rotation of the engine is kept by transmitting the running inertia force of the vehicle to the engine, and the engine is cranked up for a restart by the running inertia force of the vehicle. This limits the vehicle speed capable of executing the fuel-cut control to a higher value than the vehicle speed necessary for restarting the engine thereby to restrict the effect for improving the fuel economy.

On the other hand, the so-called "ECO-run control" is known, as another example for improving the fuel economy, to have the meaning of the "ECOnomical-ECOlogical run". This is the technique for suppressing the fuel consumption by stopping the fuel feed and the ignition, when it is satisfied as stop conditions that an air conditioner stops, and that a rightward turn signal is OFF in addition to the first condition that the vehicle stops. In this ECO-run control, the engine is cranked up and restarted by a starter or a motor-generator so that the engine can be stopped when the vehicle stops.

Since the ECO-run control is conditioned at first by the stop of the vehicle, however, it is not executed in a decelerating state where the vehicle speed is lower than the speed range in the aforementioned fuel-cut control and where the vehicle is just about to stop, so that the fuel is fed although no driving force is especially needed. In the vehicle for executing both the fuel-cut control and the ECO-run control, therefore, the fuel feed is stopped in the state where the vehicle speed is in a fuel-cut region, when the vehicle is decelerated from a predetermined speed to stop. As the vehicle speed becomes lower than the fuel-cut region, the fuel feed is then reopened. When the vehicle stops, moreover, the fuel feed is stopped again. Thus, the fuel is unnecessarily consumed between the fuel-cut control and the ECO-run control.

In Japanese Patent Laid-Open No. 8-14076 (JP-A-8-14076), there is disclosed a technique in which the fuel feed and the ignition are interrupted to stop the engine automatically when predetermined stop conditions are satisfied by the vehicle speed of substantially zero and by the parking brake ON. An additional disclosure is that when the fuel-cut control is executed prior to the automatic engine stop control at a vehicle stop, the engine stop state by the fuel-cut may be continued till the vehicle stops. However, since the fuel-cut control is executed on the premise that the engine is restarted by cranking up the engine with the running inertia force of the vehicle, as described above, it cannot be continued till the vehicle speed becomes lower than the restartable speed and the vehicle stops.

In the prior art, Japanese Patent Laid-Open No. 7-266932 (JP-A-7266932) has, proposed a control for improving the fuel economy by stopping the engine during a deceleration at a lower vehicle speed than the fuel-cut region. In the control system disclosed, the automatic stop control of the engine is executed in a predetermined deceleration state where a demanded torque is lower than the running resistance. When the state where the change in the vehicle speed is within a predetermined region (e.g., 25 Km/hour or more) for a predetermined deceleration and where the throttle opening is less than a set value (e.g., an opening corresponding to a decelerating vehicle speed) continues for a predetermined time period (e.g., about 1 sec.), the fuel injection is stopped assuming that the automatic engine stop condition is satisfied. Immediately after this (e.g., after 0.5 secs.), moreover, the clutch is released to stop the rotation of the engine completely.

In the invention disclosed in Japanese Patent Laid-Open No. 7-266932, the engine is automatically stopped during a gentle deceleration just before the vehicle stops, so that the fuel consumption can be reduced in the decelerating state between the fuel-cut control and the so-called "ECO-run control" to improve the fuel economy accordingly. In the invention disclosed in Japanese Patent Laid-Open No. 7-266932, on the other hand, a starting clutch is released to stop the rotation of the engine completely in accordance with the automatic stop control of the engine during the gentle deceleration, so that no vacuum is established in the engine. When the automatic engine stop control is to be executed during the deceleration, therefore, the vacuum of a brake system is retained by a motor-driven vacuum pump.

If this motor-driven vacuum pump is provided for executing the automatic stop control of the engine during the deceleration, however, an accessory for the vehicle is added to increase the weight of the body. As a result, the fuel economy of the vehicle is adversely affected to go against the intrinsic object to execute the automatic stop control of the engine. On the other hand, the provision of the vacuum pump raises a load on the battery. When the state of charge (SOC) of the battery is low, the vacuum pump may not be sufficiently driven to lower the braking force or the braking operability. In a vehicle having a power steering mechanism mounted thereon, moreover, the rotation of the engine is completely stopped during the deceleration. As a result, the hydraulic pump of the power steering mechanism may not be driven to fail to establish the oil pressure necessary for the steering operations.

SUMMARY OF THE INVENTION

An object of the invention is to provide a control system capable of stopping an engine automatically at a deceleration to improve the fuel economy while preventing a reduction in a drivability of a vehicle.

An example of this drivability is a braking operability, by which an event that demands a high brake pedal depression can be avoided in advance according to the invention even if the fuel feed to the engine is stopped. Another example of the drivability is a steering operability, by which an event that demands a high steering force can be avoided in advance according to the invention even if the fuel feed to the engine is stopped.

Specifically, the invention is intended to cover a vehicle equipped with an action mechanism which has an action content influenced by the rotating state of the engine. This action mechanism is exemplified by: a brake booster which can hardly establish the vacuum as the engine rotation lowers; and an oil pump which establishes a lower oil pressure as the engine rotation lowers.

The fuel feed to the engine during the running can be stopped only when no engine output is demanded. In the invention, therefore, it is decided whether or not the vehicle is coasted by the deceleration and whether or not the engine is rotated by the running inertia force owned by the vehicle. While the engine is forced to rotate by the torque transmitted from wheels, the action content of the action mechanism accords with the rotating state of the engine forced to rotate. It is decided whether or not the action content is sufficient for intrinsic functions of the action mechanism and for the running state of the vehicle. If the action content of the action mechanism is insufficient at the decision time, the stop of the fuel feed to the engine is inhibited. In other words, the fuel is continuously fed to the engine to keep it in a driving state. This prevents the action content of the action mechanism from becoming short.

If the action content of the action mechanism is sufficient, on the contrary, the fuel feed to the engine is stopped. With this sufficient action content of the action mechanism, therefore, the drivability of the vehicle is not deteriorated while improving the fuel economy.

In the invention, on the other hand, the control to stop the engine automatically at a deceleration can be executed on the basis of the selecting operation of the driver. If the fuel feed to the engine is stopped during a deceleration at a low speed to force the engine to rotate by the running inertia force owned by the vehicle, the engine rotation may become unstable and vibratory to cause the vehicle behaviors which would not occur in ordinary situations. If the driver selects controls against such behaviors by his own operations, however, the extraordinary vehicle behaviors such as the vibrations will not cause the driver to have a physical disorder.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENT

Figure 2:
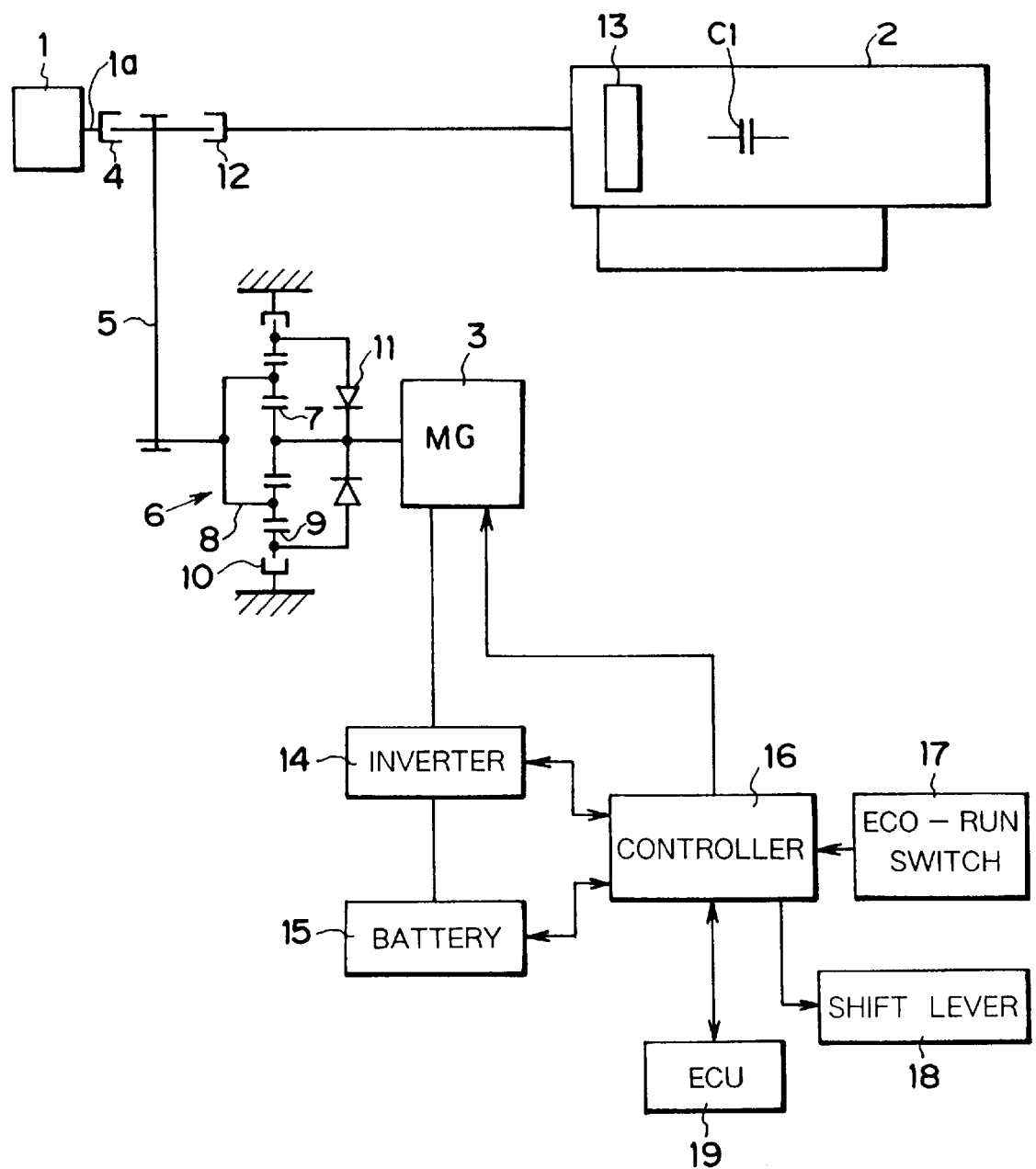
FIG. 2 is a system construction diagram showing an engine drive system of a vehicle, to which the invention is applied.

The invention will be described in connection with its specific embodiment. FIG. 2 shows one example of a drive system of a vehicle, to which the invention is applied. This drive system is constructed to stop the engine automatically, if predetermined engine stop conditions are satisfied even while the vehicle is running. In the following specific embodiment, here will be described a control system for a vehicle which adopts a stepwise automatic transmission as a vehicle speed changing system. Despite of this description, however, the invention should not be limited thereto but could be applied to a control system for a vehicle having a manual transmission or a continuously variable transmission.

To the output side of an engine 1, as shown in FIG. 2, there is coupled an automatic transmission 2. To a crankshaft 1a of this engine 1, there is coupled a motor-generator 3, which functions as a starter motor and a generator, through a clutch 4, a chain 5 and a reduction gear mechanism 6. Here, a starter motor may be provided separately from the motor-generator 3 so that the starter and the motor-generator 3 may be used together for starting the engine 1 and so that the starter may be exclusively used at an extremely low temperature.

The reduction gear mechanism 6 is constructed of a planetary gear mechanism including a sun gear 7, a carrier 8 and a ring gear 9 and is further equipped with a brake 10 for fixing the ring gear 9 selectively and a one-way clutch 11 for bringing the ring gear 9 and the sun gear 7 into selective meshing engagement. On one hand the carrier 8 is coupled to the engine 1 through the clutch 4 and on the other hand to the automatic transmission 2 through a clutch 12. Moreover, the sun gear 7 is coupled to the motor-generator 3.

The automatic transmission 2 is provided therein with an oil pump 13, which is directly coupled to the crankshaft 1a of the engine 1 through the clutches 4 and 12. The automatic transmission 2 is further provided with a well-known forward clutch C1 which is to be applied at a forward run.

With the motor-generator 3, there is connected a battery 15 through an inverter 14. This inverter 14 is constructed to control the rotating speed and torque of the motor-generator 3 by changing the electric current and frequency which are to be fed from the battery 15 or a power source to the motor-generator 3. The inverter 14 is also constructed to control the charge of electric energy from the motor-generator 3 to the battery 15.

There is provided a controller 16 for controlling the applications/releases of the clutches 4 and 12 and the brake 10 and for controlling the inverter 14, the battery 15 and an accessory such as a not-shown air conditioner. This controller 16 is constructed mainly of a microcomputer and is fed with a signal of a switch 17 for selecting an automatic stop running mode (or ECO-run mode) and a signal indicating a shift position sensor selected by a shift lever 18. Here, arrowed lines in FIG. 2 designate individual signal lines. On the other hand, the controller 16 is so connected with an electronic control unit (ECU) 19 for controlling the engine 1 and the automatic transmission 2 as to perform data communications.

Figure 3:
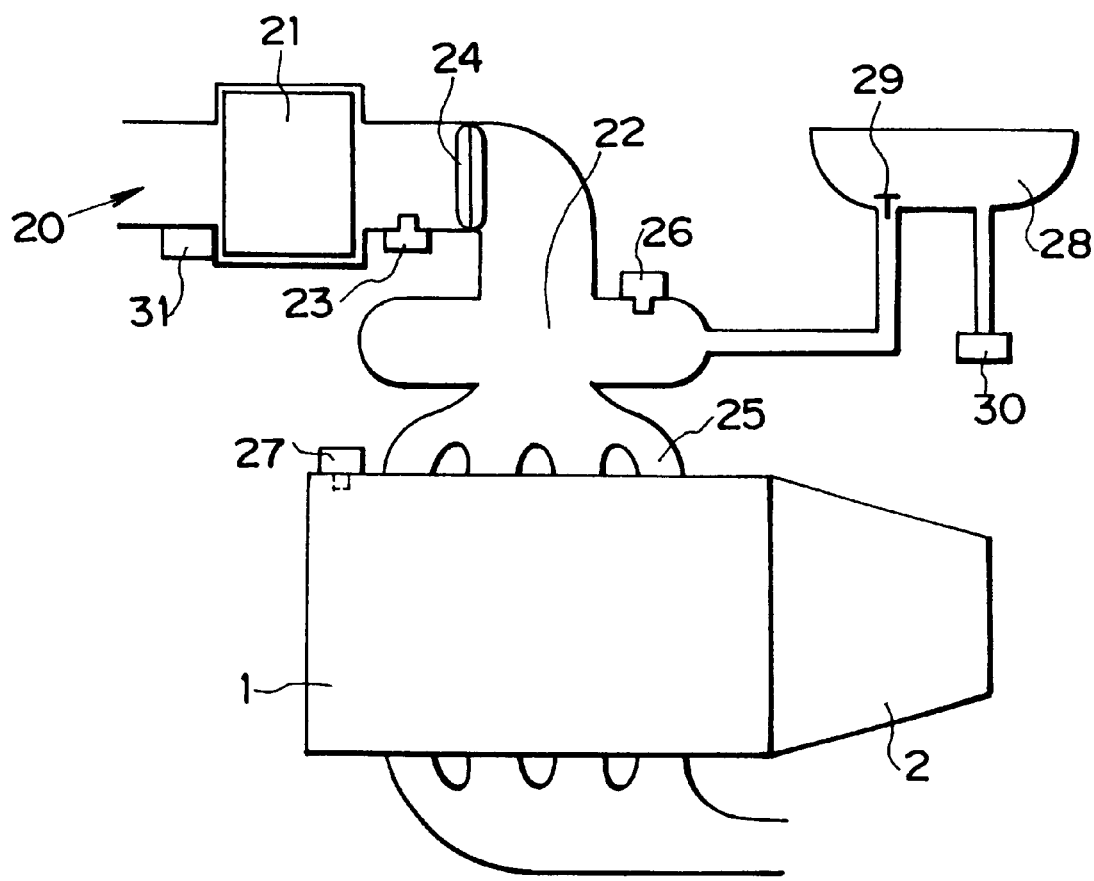
FIG. 3 is a schematic diagram showing intake/exhaust systems of the engine.

The intake/exhaust systems in the engine 1 thus constructed are shown in FIG. 3. The air, as taken in from an air intake port 20, is cleared of impurities such as dust by an air cleaner 21 and is then fed to a surge tank 22 for preventing the air pressure from pulsating. Here, the volume of air to be sucked into the engine 1 is measured by an air flow meter 23 and the volume of intake air is regulated by a throttle valve 24.

The air thus sent to the surge tank 22 is further fed to the engine 1 through an intake manifold 25. The surge tank 22 and the intake manifold 25 have substantially equal internal pressures, which are detected by a surge tank pressure sensor 26 disposed in the surge tank 22. Here, the engine 1 is provided with an engine speed sensor 27.

To the surge tank 22, there is connected through a brake booster valve 29 a brake booster 28. This brake booster 28 is provided with a brake booster pressure sensor 30 for detecting the internal pressure. Outside of the air intake port 20, there is disposed an atmospheric pressure sensor 31 for detecting the atmospheric pressure.

Figure 4:
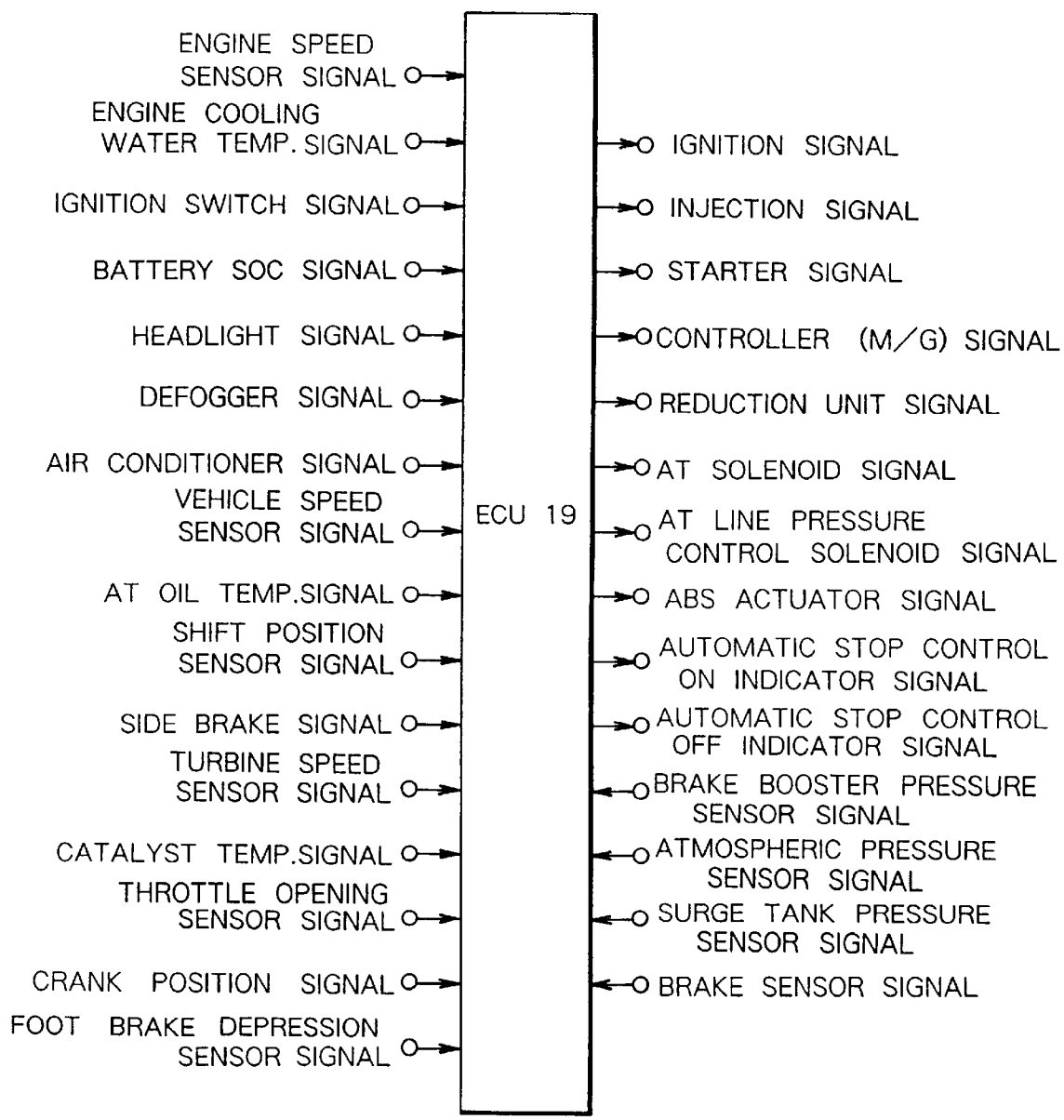
FIG. 4 is a diagram showing examples of input and output signals to and from an electronic control unit for controlling the entirety of the vehicle.

The aforementioned electronic control unit 19 is constructed to control the individual portions of the vehicle. For these controls, various signals are inputted to and outputted from the electronic control unit 19. These input/output lines of the signals to and from the electronic control unit 19 are shown in FIG. 4. At first, the input signals to the electronic control unit 19 will be enumerated as follows: a signal coming from the engine speed sensor 27; a signal indicating engine cooling water temperature; a signal coming from a (not-shown) ignition switch; a signal indicating the state of charge (SOC) of the battery 15; a signal indicating the ON/OFF state of a (not-shown) headlight; a signal indicating an acting state of a (not-shown) defogger; a signal indicating an acting state of the air conditioner; a signal coming from a (not-shown) vehicle speed sensor; a signal indicating oil temperature of the automatic transmission (AT) 2; a signal coming from a (not-shown) shift position sensor; a signal indicating an acting state of a (not-shown) side brake; a signal coming from a (not-shown) turbine speed sensor for detecting a rotating speed of a turbine of a torque converter (although both are not shown); a signal indicating temperature of a (not-shown) exhaust cleaning catalyst; a signal coming from a (not-shown) throttle opening sensor; a signal indicating a crank position; a signal coming from a (not-shown) foot brake depression sensor; a signal coming from the brake booster pressure sensor 30; a signal coming from the atmospheric pressure sensor 31; a signal coming from the surge tank pressure sensor 26; a signal coming from a (not-shown) brake sensor; and so on. On the other hand, the output signals will be enumerated as follows: an ignition signal; an injection signal concerned with the fuel; a signal to the (not-shown) starter; a signal to the controller 16 for the motor-generator 3; a signal to a (not-shown) speed reducer; a signal to a (not-shown) solenoid in the automatic transmission (AT) 2; a signal to a (not-shown) line pressure control solenoid in the automatic transmission (AT) 2; a signal to a (not-shown) actuator in an anti-lock brake system (ABS); a signal to an automatic stop control ON indicator; a signal to an automatic stop control OFF indicator; and so on.

Figure 5:
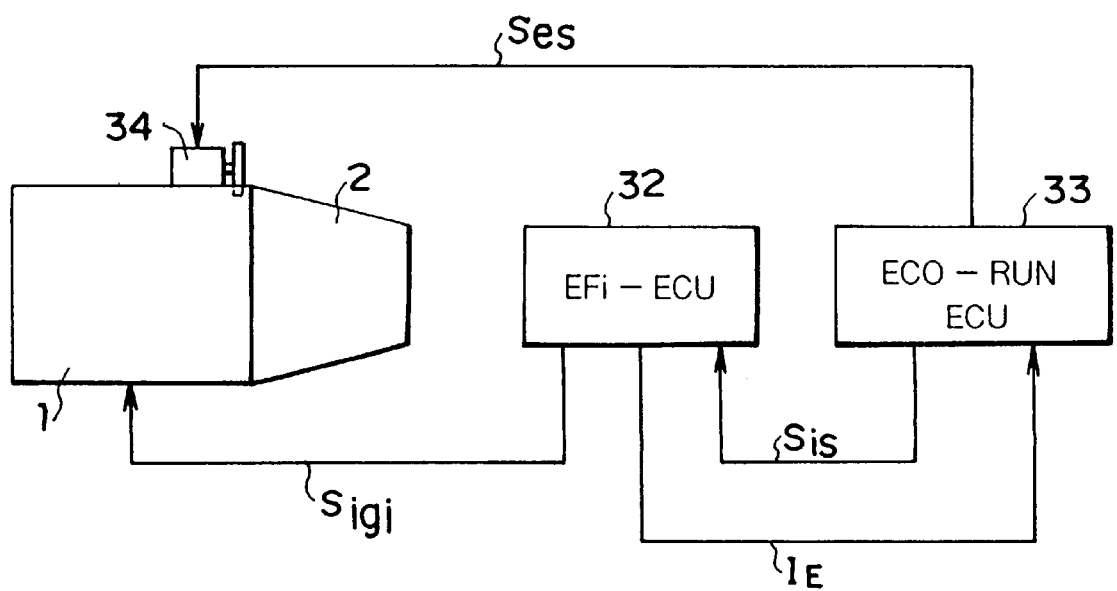
FIG. 5 is a block diagram showing relations among the engine, an EFi-ECU and an ECO-run-ECU.

The engine 1 is constructed to control the ignition and the ignition timing electrically and to inject and feed the fuel. As shown in FIG. 5, moreover, there is provided an electronic control unit (EFi-ECU) 32 for controlling the ignition and the ignition timing and for controlling the fuel injection. There is also provided an electronic control unit (ECO-run-ECU) 33 for executing the automatic stop control of the engine 1 on the basis of the state of the vehicle. The EFi-ECU 32 outputs an ignition/injection signal Sigi to the engine 1 and an engine control information IE to the ECO-run-ECU 33. Moreover, this ECO-run-ECU 33 outputs an injection stop demanding signal Sis for stopping the feed of the fuel to the EFi-ECU 32 and a start signal Ses for restarting the engine 1 by driving a starter 34 or the motor-generator 3 to the engine 1. Here, these electronic control units 32 and 33 are so connected with the aforementioned electronic control unit 19 as to perform data communications.

Here will be described the actions of the control system thus constructed according to the invention. This invention adopts the system, in which the engine is stopped when predetermined engine stop conditions are satisfied even while the vehicle is running. After the engine stop, the accessory such as the air conditioner can be driven by the aforementioned motor-generator 3, but the invention could be applied to a vehicle on which the motor-generator 3 is not mounted. Moreover, since the invention has no relation to controls after the engine stop, the following description will be stressed on the controls till the engine stop.

First of all, the engine stop conditions while the vehicle is running will be specifically described. The specific embodiment to be described is intended to cover the vehicle having the automatic transmission 2 mounted thereon. Therefore, the engine stop conditions of the vehicle having the automatic transmission 2 will be enumerated as follows. However, the invention could also be applied to a vehicle having a manual transmission mounted thereon. The engine stop conditions may be different from those enumerated as follows, when the invention covers the vehicle having the manual transmission.

In the vehicle having the automatic transmission 2 mounted thereon, the fuel feed to or the ignition of the engine 1 is interrupted, if the following conditions are satisfied on the premise that the switch 17 for selecting the aforementioned automatic stop running mode (or the ECO-run mode) is turned ON by the driver. Here, the reason for premising that the switch 17 is turned ON by the driver is to confirm that the driver has recognized or admitted either that the engine 1 is stopped during the deceleration of the vehicle or that the rotation of the engine 1 is modulated just before the stop of the vehicle:

(1) (Atmospheric Pressure Pa)
    (Brake Booster Pressure Pb)$\geq \alpha$;
(2) Throttle Opening $\theta \leq \theta 1$;
(3) Engine Speed $NE \geq NE1$;
(4) Shift Position$\neq$"Non-Running Position"; and
(5) Vehicle Speed $Ve \geq Ve1$.

Here, the "Non-Running Position" means a position such as a parking position or a neutral position, at which the engine 1 and the output shaft of the automatic transmission 2 (or drive wheels) are uncoupled. Therefore, the automatic stop of the engine 1 during the running is conditioned by the fact that the engine 1 is driven by the rotating force of the wheels.

Here will be briefly described the problems of the case in which the engine is stopped in the prior art while the vehicle is running. When the engine is stopped during the running of the vehicle, the pressure of the intake manifold or surge tank for playing the role of a passage to suck the air into the engine cannot be kept in a vacuum, depending upon running states of the vehicle. As a result, the internal pressure of the brake booster is not kept in a vacuum but rises to approach the atmospheric level. Then, the brake assisting performance by the brake booster may drop.

In the invention, therefore, it is decided whether or not the performance of the brake booster 28 is sufficient or whether or not the running state (or the driving state) can retain the performance. If it is decided that the performance is not sufficient, the engine 1 is not automatically stopped while the vehicle is running.

The decision on whether or not the performance of the brake booster 28, i.e., the braking force is sufficient is made by comparing the detected values which are respectively obtained from the atmospheric pressure sensor 31 for detecting the atmospheric pressure Pa and the brake booster pressure sensor 30 for detecting the internal pressure Pb of the brake booster 28. When the pressure difference is smaller than a predetermined value α, it is decided that the performance of the brake booster 28 is not sufficient. This decision corresponds to the confirmation which is exemplified by the foregoing inequality (1). Here, the predetermined value α is defined to retain a vacuum sufficient for eliminating the deterioration of the brake assisting performance.

In the control system according to the invention, the brake assisting performance is decided not only by the output value of the brake booster pressure sensor 30 but by the difference from the atmospheric pressure. As a result, the performance of the brake booster 28 can be accurately judged when the vehicle is running not only on a high land but also on a low land. In the control system of the invention, therefore, the engine 1 is stopped when the brake assisting performance by the brake booster 28 can be sufficiently retained. This makes it possible to prevent such a situation in advance that a high brake depression is required, even when the engine 1 is stopped.

In the aforementioned condition (2), on the other hand, a threshold value θ1 for judging the throttle opening θ is zero or approximately zero. When the throttle opening θ is zero, an accelerator pedal is completely returned (or released). When the throttle opening θ is approximately zero, on the other hand, the accelerator pedal is substantially returned. With the throttle being thus closed at that value θ, the vehicle is in the driven state or in the similar state where the vehicle is coasted by the running inertia force. Under the condition (2), more specifically, there is decided either a decelerating state in which the driver does not demand the driving force or a decelerating state in which the driver stops the vehicle. In this state, the internal pressure of the surge tank 22 grows so low that the vacuum can be easily retained. In other words, the throttle valve 24 is closed to reduce the rate of air flow to be sucked. Since this state is also established when the accelerator pedal is temporarily loosened, as will be described hereinafter, it is decided that the condition (2) is satisfied when it continues for a predetermined period (e.g., about 2 secs.), so as to make a discrimination from such temporary state.

The description will proceed to the condition (3). After the rotation of the engine 1 stopped completely, the internal pressure of the surge tank 22 rises toward the atmospheric level. Even if the brake booster valve 29 is closed to bring the brake booster 28 into a similar state, the rotation of the engine 1 stops completely at a gear stage such as the D-position where the engine brake is ineffective, so that the vacuum of the brake booster 28 will not rise any more. As one condition for ensuring a sufficient vacuum in the brake booster 28, therefore, there is adopted the condition (3) that the engine speed is more than a predetermined value. Specifically, this predetermined engine speed NE1 is set to a value lower than an idle speed NEi. Here, the (not-shown) oil pump in a power steering system is also driven by the engine 1, so that the steering effort at the automatic engine stop control during the running is compensated by conditioning the number of revolutions of the engine 1 for the automatic engine stop control.

While the engine 1 is active in the decelerating state, the engine speed NE is kept at an idle value, so that the engine speed NE will not fall below the value normally. In a transient state where the engine 1 is restarted to have a rising speed, however, the engine speed NE may be lower than the idle value. In this state, the vacuum of the brake booster 28 may not be sufficiently retained, so that the condition (3) functions not to start the automatic stop control of the engine 1 even if other conditions are satisfied. When the vehicle mounting the manual transmission thereon has its clutch applied or when the vehicle mounting the automatic transmission 2 thereon is in a gear stage for a sufficient engine brake, on the other hand, the engine 1 is forced to rotate by the running inertia force of the vehicle even if the fuel feed is interrupted. As a result, a vacuum is established on the intake side so that the vacuum in the brake booster 28 is retained. The condition (3) thus far described also performs the function to decide the establishment of the vacuum.

The condition (4) is to confirm that the engine 1 is coupled to the drive wheels. In a general automatic transmission having gear stages, a one-way clutch is applied to set a predetermined gear stage. In the case of a coasting at that gear stage, therefore, the one-way clutch is released not to transmit the running inertia force to the engine. At a non-running position such as the neutral position or the parking position, however, the transmission of power is positively blocked. If the fuel feed to the engine 1 is blocked, therefore, the cause for establishing the vacuum in the engine 1 disappears. Therefore, the condition (4) is provided for inhibiting the automatic stop control of the engine 1 when this non-running position is selected. In other words, with the non-running position being set, the engine 1 does not receive any rotating force from at least the road surface so that the retention of the vacuum in the brake booster 28 is not ensured. Thus, there is provided the condition (4).

Here, either in the case of a forward shift position of "2", "L" or "D" where the engine brake is effective or in the case of the manual transmission, there is established the so-called "driven state" in which the engine 1 is driven by the rotating force from the road surface even if the fuel injection into the engine is interrupted, so that a sufficient vacuum can be retained in the intake manifold 25 and the surge tank 22. Therefore, the condition (4) may be also one for deciding the state in which the sufficient vacuum can be established in the brake booster 28.

In the invention, the condition (4) could be modified for the vehicle mounting the manual transmission into "unless the clutch pedal is depressed".

The aforementioned condition (5) is one for confirming that the vehicle is not in a state just before a stop. This condition is provided because the braking is especially important just before the stop. For the manual transmission, this condition also implies that the engine 1 receives a sufficient rotating force from the road surface. Therefore, the condition (5) can be considered like the conditions (3) and (4) as one for deciding whether or not the sufficient vacuum is retained in the brake booster 28.

If all those five conditions are satisfied, the fuel injection stop demand is outputted from the ECO-run-ECU 33 for the automatic engine stop control, as shown in FIG. 5, to the EFi-ECU 32 so that the EFi-ECU 32 outputs the signal to interrupt the ignition of the engine 1 and the injection of the fuel. On the contrary, the engine control information is transmitted from the EFi-ECU 32 to the ECO-run-ECU 33.

Thus, in the control system of the invention, the automatic stop control of the engine 1 is effected when the vacuum of the brake booster 28 can be kept sufficient, so that the sufficient brake assisting function can be retained while improving the fuel economy.

Here, the automatic stop condition of the engine 1 may be limited to the foregoing condition (1). If this condition (1) is satisfied, the automatic engine stop control may be entered as it is. Even when the vehicle speed or the engine speed drops, on the other hand, the engine 1 may continue its automatic stop without being restarted, depending on the situations of the vehicle. When it is detected, after the engine 1 was stopped so that the vehicle speed dropped to zero, that the ignition key is turned OFF, still moreover, the engine 1 is left stopped, and the operations for a parking are performed. Furthermore, the engine stop condition during the running may naturally be different from that at the stop of the vehicle.

On the other hand, the restart of the engine 1 may be executed unless any of the foregoing conditions is satisfied, for example. After these conditions were satisfied, however, the stops of the fuel injection and the ignition may be continued if the brake ON signal is inputted and if the vacuum of the brake booster 28 is retained. If a vehicle speed is established at the brake OFF, on the other hand, the engine 1 may be cranked up. Still moreover, the stop of the fuel injection and the stop of the ignition may be continued when the vehicle speed is not established at the brake OFF and when the engine stop conditions in the automatic engine stop control at the vehicle stop are satisfied as they are.

Figure 1:
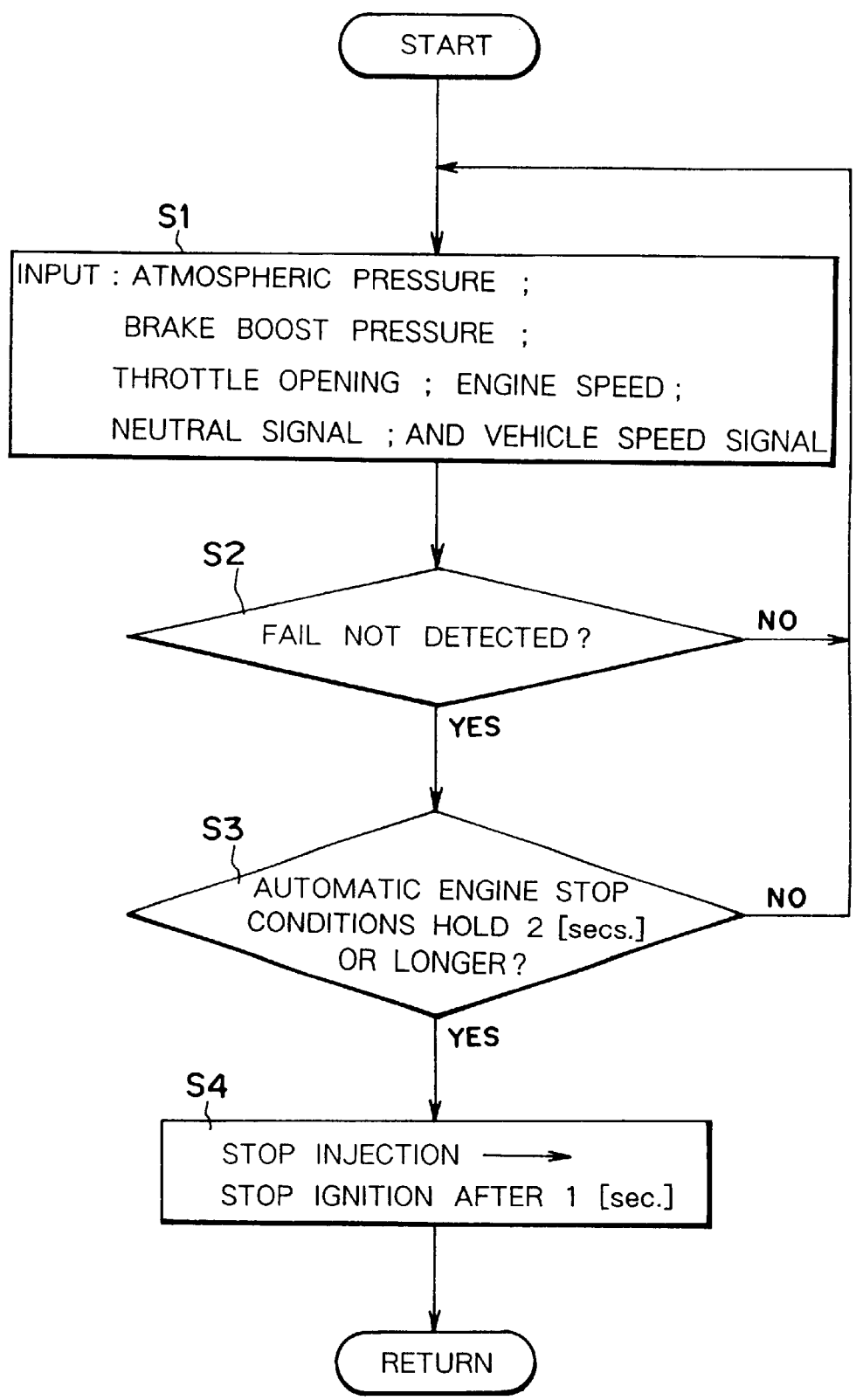
FIG. 1 is a flow chart for explaining the controls executed at an engine stop of a vehicle in accordance with the invention.

The controls to be executed by the control system according to the invention will be described with reference to the flow chart of FIG. 1. At Step S1 in FIG. 1, the electronic control unit 19 inputs signals including: a detected atmospheric pressure Pa coming from the atmospheric pressure sensor 31; a brake boost pressure Pb coming from the brake boost pressure sensor 30; a throttle opening θ coming from the throttle opening sensor; the engine speed NE coming from the engine speed sensor 27; a neutral signal coming from the shift position sensor; and the vehicle speed Ve coming from the vehicle speed sensor. It is then decided at Step S2 whether or not the individual sensors have not failed. If it is decided that the sensors have not failed, the routine advances to Step S3, at which it is decided whether or not the aforementioned automatic stop conditions of the engine 1 have held for a predetermined time period (e.g., 2 secs.).

If the answer of Step S3 is YES, the routine advances to Step S4. At this Step S4, the command to stop the fuel injection is outputted from the ECO-run-ECU 33 to the EFi-ECU 32, and the ignition stop command signal is outputted after a predetermined period (e.g., 1 sec.), because the automatic engine stop conditions have been already satisfied. Here, the routine returns to Step S1 if the fail was detected at Step S2 or if the engine stop conditions do not hold for a predetermined period.

Here, the specific embodiment thus far described is exemplified by the brake booster 28 as an action mechanism and by the vacuum as an action content, but the invention should not be limited to that specific embodiment. In short, the action mechanism in the invention may be any member of which action content is influenced according to the rotating state of the engine 1. In addition to the brake booster 28, there may be enumerated as the action mechanism: the oil pump of the automatic transmission 2; the oil pump in a power steering system; a water pump for the cooling water of the engine 1; and a fan of a radiator. Regarding the oil pump of the automatic transmission 2, moreover, the time elapsed from the start at a low temperature may be set as the stop inhibiting condition. In order to retain the steering operability on a rough road, for example, the oil pump of the power steering system may be conditioned by the fact that the road situation detected by a navigation system is rough. Moreover, the water pump or the fan of the radiator may be so conditioned by the engine water temperature as to inhibit the automatic engine stop.

Here will be synthetically described the merits to be obtained by the invention. According to the invention, the engine is forced to rotate by the running inertia force at a deceleration so that the fuel feed to the engine is stopped when the action content of the action mechanism is sufficient. As a result, no trouble arises in the driving operation using the action mechanism, and the fuel consumption can be suppressed to improve the fuel economy. If the action content of the action mechanism is insufficient in the state where the engine is forcibly rotated, on the other hand, the fuel feed to the engine is continued, so that the action content of the action mechanism does not become insufficient. In this case, too, it is possible to prevent the drivability of the vehicle from becoming low.

According to the invention, on the other hand, when it is decided that the vacuum of the brake booster is so insufficient that the braking force drops, the stop control of the fuel feed to the engine at the deceleration is inhibited and the engine is continuously run. As a result, the vacuum established in the engine can be utilized to make the action content of the brake booster sufficient, and a necessary braking force can be generated to keep the drivability satisfactory.

Moreover, the fuel feed to the engine may be stopped when the predetermined conditions are satisfied during the deceleration thereby to unstabilize the rotation of the engine. However, this state is based on the fact that the driver selects the execution of the automatic stop control, so that the physical disorder, as might otherwise accompany the instability of the engine speed, can be avoided according to the invention.

What is claimed is:

1. An automatic engine stop control system for a vehicle, which has: an engine to be activated when fed with a fuel; and a brake booster for assisting a braking force which has an action content influenced by a rotating state of the engine, and in which the fuel feed to the engine is stopped when predetermined conditions are satisfied during a running of the vehicle, comprising:

rotating state deciding means for deciding that the engine is forced to rotate by a running inertia force owned by the vehicle while the vehicle is coasting;

action state deciding means for deciding that the action content of the brake booster is insufficient when a pressure difference between a vacuum in the brake booster and an atmospheric pressure drops to a lower level than a predetermined value, in a state where the engine is forced to rotate by the running inertia force of the vehicle; and automatic stop inhibition means for inhibiting the stop of the fuel feed to the engine when it is decided by the action state deciding means that the pressure difference between the vacuum in the brake booster and the atmospheric pressure drops to a lower level than the predetermined value.

2. An automatic vehicle engine stop control system according to claim 1, wherein the action mechanism includes a brake booster for assisting a braking force, and wherein the action state deciding means includes means for deciding that the action content is insufficient when the braking force generated by the brake booster is lower than a predetermined value.

3. An automatic vehicle engine stop control system according to claim 2, wherein the action state deciding means further includes means for deciding that the action content is insufficient when a pressure difference between a vacuum in the brake booster and an atmospheric pressure drops to a lower level than a predetermined value.

4. An automatic vehicle engine stop control system according to claim 1, further comprising:

an automatic stop control selecting mechanism for executing an automatic stop control to stop the fuel feed to the engine when it is manually operated and when predetermined conditions are satisfied during the running of the vehicle.

5. An automatic vehicle engine stop control system according to claim 1, wherein the predetermined conditions contain the fact that the state where a throttle opening is less than a predetermined degree continues for a predetermined time period.

6. An automatic vehicle engine stop control system according to claim 1, further comprising:

means for stopping an ignition of the engine after a predetermined time period was elapsed from the instant when the fuel feed to the engine had been stopped.

7. An automatic engine stop control system for a vehicle, which has: an engine to be activated when fed with a fuel; and an action mechanism having an action content influenced by a rotating state of the engine, and in which the fuel feed to the engine is stopped when predetermined conditions are satisfied during a running of the vehicle, comprising:

rotating state deciding means for deciding that the engine is forced to rotate by a running inertia force owned by the vehicle while the vehicle is coasting;

action state deciding means for deciding that the action content of the action mechanism in a state where the engine is forced to rotate by the running inertia force of the vehicle;

automatic stop inhibition means for inhibiting the stop of the fuel feed to the engine when it is decided by the action state deciding means that the action content of the action mechanism is insufficient; and means for stopping an ignition of the engine after a predetermined time period has elapsed from an instant when the fuel feed to the engine has been stopped.

* * * * *